H. P. KRAFT.
METHOD OF MAKING DUST CAPS FOR TIRE VALVES.
APPLICATION FILED MAR. 21, 1919.
1,405,042.
Patented Jan. 31, 1922.
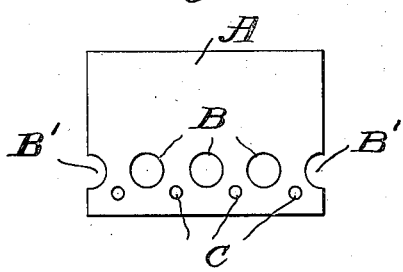
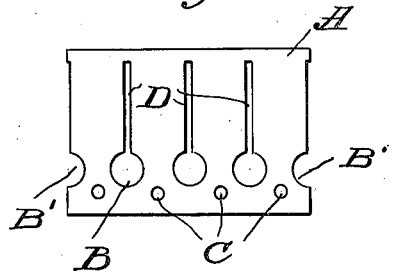
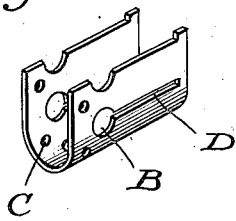
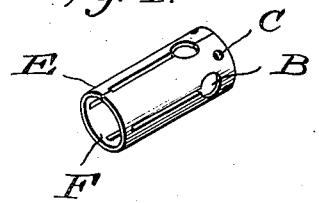
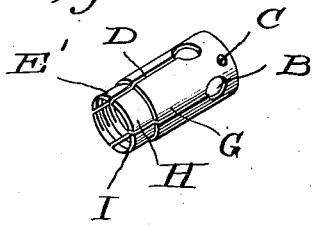
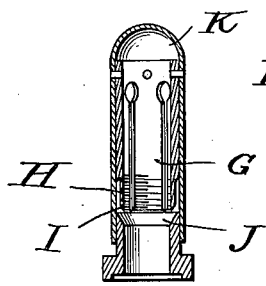
INVENTOR
Henry Phillip Kraft,
By Attorneys,

UNITED STATES PATENT OFFICE.

HENRY PHILLIP KRAFT, OF RIDGEWOOD, NEW JERSEY.

METHOD OF MAKING DUST CAPS FOR TIRE VALVES.

1,405,042.      Specification of Letters Patent.    Patented Jan. 31, 1922.

Application filed March 21, 1919. Serial No. 284,012.

*To all whom it may concern:*

Be it known that I, HENRY PHILLIP KRAFT, a citizen of the United States of America, residing at Ridgewood, in the county of Bergen and State of New Jersey, have invented certain new and useful Improvements in Methods of Making Dust Caps for Tire Valves, of which the following is a specification.

This invention relates to dust caps for tire valves, and aims to provide certain improvements therein.

More particularly, it relates to the manufacture of the type of cap shown in the patent to Aiken, No. 1,123,157. In this construction there is provided an internal sleeve which is fastened to the dust cap, which sleeve is formed with spring arms adapted to be collapsed by a wedge member into contact with the tire valve casing when the cap portion is pressed downwardly upon the wedging portion.

In the formation of such caps the construction of the internal spring sleeve is expensive, both on account of the cost of the original blank and the subsequent operations of forming it to the required shape.

According to the present invention, I construct such sleeve of flat sheet metal, thereby much simplifying the subsequent operations and considerably cheapening the cost.

In the drawings which illustrate one embodiment of the invention,—

Figure 1 is a plan of the blank after the first operation;

Fig. 2 shows the second step.

Fig. 3 is a perspective view of the blank partly bent.

Fig. 4 is a similar view showing the blank completely bent to circular form;

Fig. 5 is a view of the blank after the contracting and screwthreading operations.

Fig. 6 is a view of the completed cap.

In practicing the invention the blanks are cut from a strip of sheet metal, the first operation cutting the blank A to its proper dimensions and punching holes B B and marginal semi-circular recesses B' B'; also smaller holes C C are punched in the required number.

The blank is then slotted by a suitable press, as shown at D D, the slots extending to a portion close to the upper edge of the blank and joining the holes B B at their lower ends. The slots D D may be of any suitable width, that shown in the drawing being sufficient.

After the blanks are so slotted, they are placed in the press and given the U-shape form shown in Fig. 3. The ends of the blank are then curled over, so that it assumes the tubular form of Fig. 4.

The end E of the tubular structure is then contracted, as shown at E' in Fig. 5. This contraction may be made by suitable dies, four in number, which are arranged transversely of the blank and contract the same over a suitable arbor, which may be of the expanding and contracting type. The sleeve is then ready for the screwthreading operation, which may be accomplished by the use of a suitable die, and at or immediately after the screwthreading operation, a tool is advanced which cuts off the margin of metal F (Fig. 4), which extends beyond the ends of the slots D. The removal of this metal forms four spring arms or tongues G, each of which is provided with a narrow neck portion H, which increases its springiness. The cutting tool also faces off a bevel I at the bottom of each spring arm or tongue, which is adapted to contact with the wedge face J of the cap.

By constructing the device in this manner, I am enabled to handle the blank as a closed structure, and this is particularly important in connection with the subsequent operations of forming the blank into tubular form, contracting the end thereof, and screwthreading the ends of the arms. These operations would be difficult if the blank was cut through to leave the ends of the arms free before these operations take place. According to the preferred form of the invention, therefore, the sleeve is formed practically complete before the final cutting operation which releases the ends of the arms. At the same time the usual wedging surface may be formed thereon.

The completed sleeve is best riveted to the cap portion K (Fig. 5), the rivets passing through the holes C and corresponding holes in the cap portion, as shown.

It will be observed that in the construction illustrated, when the blank is rolled to tubular form, the semi-circular recesses B' B' coincide to form a circular hole such as B. It will also be observed that the tubular member has a butt joint at the juncture of the edges. However, this is not detrimental to its operation.

It will be understood that in place of applying a single blank, a plurality of blanks may be employed, which may be longitudinally united. For example, the blank shown in Fig. 2 may be centrally divided in line with the middle slot.

While I have shown and described one method of practicing the invention, it will be understood that I do not wish to be limited thereto, since various changes may be made therein without departing from the scope of the appended claims.

What I claim is:—

1. The method of forming a tubular structure having arms, which comprises slotting portions of a flat blank, forming the blank into tubular form, and cutting away the metal beyond the ends of the slots, whereby to free the ends of the arms.

2. The method of forming a tubular structure having arms, which comprises slotting a flat blank, rolling and contracting the end of the blank, and cutting away the metal beyond the ends of the slots, whereby to free the ends of the arms.

3. The method of forming a tubular structure having arms, which comprises slotting a flat blank, rolling the same into tubular form, screwthreading one end of the blank, and cutting away the metal beyond the ends of the slots, whereby to free the ends of the arms.

4. The method of forming a tubular structure having arms, which comprises slotting a flat blank, rolling the same into tubular form, contracting and screwthreading one end of the blank, and cutting away the metal beyond the ends of the slots, whereby to free the ends of the arms.

5. The method of forming a dust cap having spring arms, which comprises slotting portions of a flat blank, forming the blank into hollow form, and cutting away the metal beyond the ends of the slots, whereby to free the ends of the arms.

6. The method of forming a dust cap having spring arms, which consists in slotting a flat blank, forming the same into tubular form, contracting and threading one end of the blank, and cutting away the metal beyond the ends of the slots, whereby to free the ends of the arms, and mounting said member in a closed end cap.

7. The method of forming a dust cap having spring arms comprising the formation of the spring arms from a flat blank by rolling said blank into a tubular form, and inserting said blank in a closed end cap.

8. The method of forming a dust cap having screw threaded spring arms, comprising the formation of the arms from a flat blank by rolling said blank into a tubular form, and screw threading said arms.

9. The method of forming a tubular structure having arms, which comprises slotting portions of a flat blank to form arms, forming the blank into tubular form, screwthreading portions constituting the ends of the arms and externally tapering the ends of the arms.

In witness whereof, I have hereunto signed my name.

HENRY PHILLIP KRAFT.